United States Patent

[11] 3,578,019

| [72] | Inventor | Marco Turolla<br>213, Via Toscana, Bologna, Italy |
|---|---|---|
| [21] | Appl. No. | 786,606 |
| [22] | Filed | Dec. 24, 1968 |
| [45] | Patented | May 11, 1971 |
| [32] | Priority | Jan. 4, 1968 |
| [33] | | Italy |
| [31] | | 6704A/68 |

[54] RELIEF VALVE UNIT FOR HYDRAULIC PRESSURE LINES
5 Claims, 1 Drawing Fig.

[52] U.S. Cl. .................................... 137/491,
137/514.7, 251/360
[51] Int. Cl. .................................... F16k 17/10
[50] Field of Search ........................... 137/489,
491, 489.3, 514.5, 514.7; 251/43, 50; 251/360, 359, 36

[56] References Cited
UNITED STATES PATENTS

| 85,006 | 12/1868 | Harrison | 251/50 |
|---|---|---|---|
| 361,771 | 4/1887 | Mason | 137/489.3 |
| 611,053 | 9/1898 | Cameron | 251/36 |
| 2,150,266 | 3/1939 | Cotner | 137/491 |
| 2,351,512 | 6/1944 | Holt | 137/514.7X |
| 3,335,746 | 8/1967 | Lebow | 137/491X |
| 3,401,605 | 9/1968 | Born | 137/491X |

FOREIGN PATENTS

| 302,306 | 10/1932 | Italy | 137/514 |

Primary Examiner—M. Cary Nelson
Assistant Examiner—R. B. Rothman
Attorney—Berman, Davidson and Berman ABSTRACT: A differential-piston relief valve provided with a shock- and vibration-absorbing plunger and a spring-urged pilot vent valve for operating the relief valve are mounted in a single cylindrical hollow body in which the cylinders for the relief valve and attached plunged and the housing for the vent valve are bored. The hollow body is closed at one end by a screw plug, acting also as vent valve spring-adjusting means, and with external screw threads for mounting the whole as a unit in a blind bore of a block forming a part of the hydraulic pressure line. The hollow body is provided with inlet- and outlet ports which come to be in front of corresponding ports opening within the blind bore of said block, thus completing the hydraulic circuit.

PATENTED MAY 11 1971  3,578,019
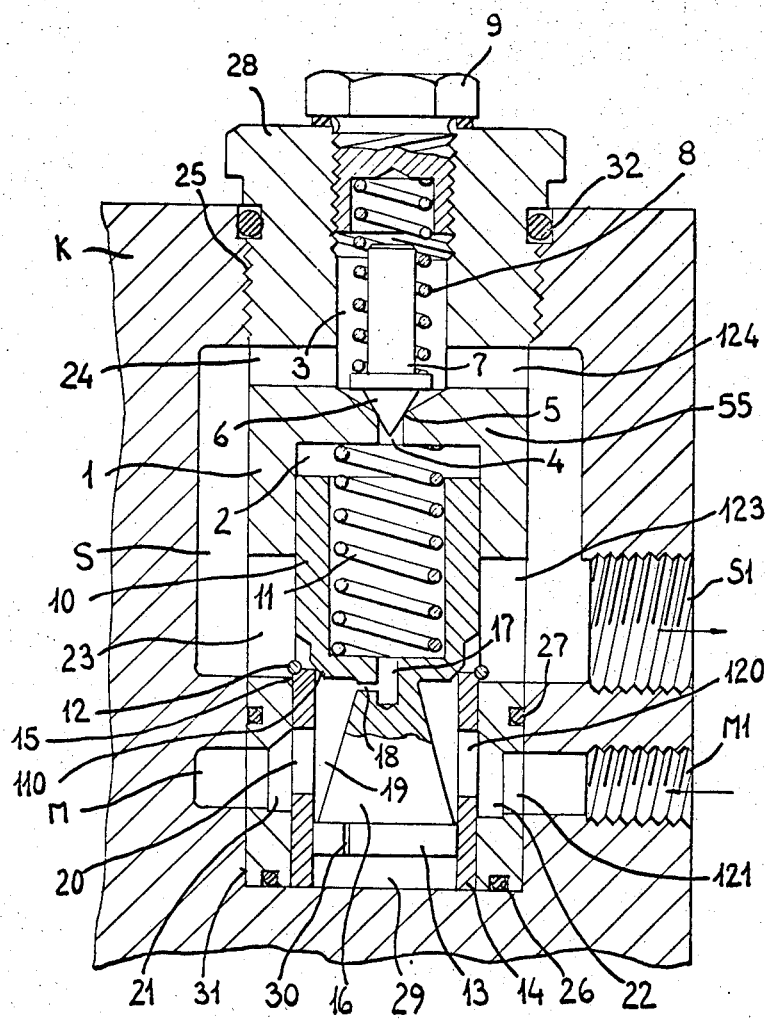
INVENTOR
MARCO TUROLLA
BY Berman, Davidson & Berman
ATTORNEYS

RELIEF VALVE UNIT FOR HYDRAULIC PRESSURE LINES

BACKGROUND OF THE INVENTION

This invention relates to safety or relief valves for hydraulic pressure lines or machinery, this latter term including all systems having a hydraulic, or usually an oil-hydraulic, pressure line.

The object of the invention is to provide a safety or overload relief valve unit to be inserted in hydraulic pressure lines which comprises an automatic vent valve acting as pilot for a balanced-piston relief valve, provided with shock and vibration-absorbing means, in order to avoid shocks, which would be capable to damage in a short time the seating and valve face, and to prevent objectionable chatter.

According to the invention, the said pilot valve-controlled relief valve is of the balanced piston type and is so constructed and inserted in the hydraulic pressure line system, as to be maintained closed until the pressure on both faces is equal and fully opens almost instantaneously, under the influence of the difference of hydraulic pressure whenever the value of the "-back pressure" (i.e. the pressure of the liquid on the rear vale piston face) falls substantially below the value of the "front pressure," due to the opening of the pilot "vent valve."

When said vent valve closes, due to the substantial reduction of the back pressure on the balanced piston relief valve, also the relief valve closes, due to the rebuilding up of the back pressure. In order, however, to effect a smooth operation and avoid shocks and chatter of the balanced-piston relief valve, this valve is provided with shock and vibration absorber means.

According to one preferred embodiment of the invention, to the piston of the relief valve a shock and vibration dampening plunger member is attached in spaced relation with the front valve piston face. This plunger slides with an untight fit in a chamber or cylinder which is full with liquid, the whole being so constructed as to permit, during the sliding of the plunger, the throttled flow of the fluid from either plunger side to the other.

Of course, this throttled flow may be obtained either by providing longitudinal grooves or riflings along the peripheral plunger and/or cylinder walls, or also by providing throttled-flow passages in the plunger, or small side ducts in the cylinder, opening at both ends beyond the positions of the plunger faces at its stroke ends. Said throttled flow passages and/or ducts might be also provided with small automatic valves, for increasing or reducing the throttling of the flow in one or both directions.

According to one preferred embodiment of the invention, which is shown in the accompanying drawing, the said relief valve is a differential tumbler-shaped piston valve mounted in a cylinder and provided with a throttled passage putting into communication the chambers on both piston faces. Appended to said piston of the relief valve is a motion-damping plunger sliding in a cylinder filled with liquid, means being provided for permitting a throttled flow of the liquid across said plunger. Said relief valve is operated by a pilot vent valve which opens whenever the safety pressure limits are overcome and thus promotes the dumping of some liquid from the adjoining relief valve chamber and thus permits the opening of this valve by pressure of the liquid on the opposite relief valve face.

In said preferred embodiment, the relief valve with attached plunger and the cylinders in which they are slidably mounted, as well as the pilot valve form together a single unit adapted to be mounted, as by simple screwing, into a supporting member or block containing a part of the hydraulic circuit.

Said preferred embodiment of overload relief valve unit, including an automatic pilot valve, will be now described, reference being had to the accompanying drawing.

SHORT DESCRIPTION OF THE DRAWING

In this drawing, the only FIGURE shows a longitudinal section on a diametrical plane through a part of a supporting block in which a safety valve unit is mounted.

DESCRIPTION OF THE PREFERRED EMBODIMENT

In the drawing, 1 is the cylindrical body of the safety valve. The valve body comprises an intermediate cylindrical chamber or cylinder 2 and a counterbored top chamber 3, separated from the cylinder 2 by a partition 55 having a through bore 4 provided with a conical valve seat 5.

In the top chamber 3 a pilot needle valve 6 is mounted, provided with a stem 7 and urged against the conical seat 5 by a gauged helical spring 8 compressed between an abutment collar on stem 7 and a screw plug 9 constituting the closure member of chamber 3 and serving also as member for adjusting the pressure of the spring 8. Valve 6 is so mounted as to be shifted clear of its seat 5 when the pressure in the cylinder 2 exceeds a predetermined maximum, which may be regulated also by screwing more or less the plug 9 and thus constitutes a primary safety valve which, as will be seen hereinafter, serves as pilot valve promoting the opening of the underlying relief valve, by venting its opening and some liquid under pressure from the adjoining valve chamber through outlet ports 24, 124 and permits the closure of the opened relief valve when it is again closed, as soon as the liquid pressure falls below a predetermined limit.

The intermediate cylindrical chamber 2, which constitutes the cylinder for the relief valve, is the inner section (the top section in the drawing) of a blind bore 22 whose bottom is the partition 55. In the open end section of this bore 22 a cylindrical sleeve 14 is tightly fitted and maintained in its end position by abutting against a retaining spring ring 12. Thus the sleeve 14 restricts the bottom end section of the cylinder 2 and the active area of the bottom face 110 of the piston 10 when same bears against the seat-forming inner edge 15 of said sleeve 14, so that said piston functions as balanced differential piston valve which closes or opens large outlet ports 23, 123 in body 1.

The piston 10 is tumbler shaped and is usually maintained in closed position 15 by a spring 11 inserted between the inside of the tumbler bottom and the partition 55. Above said sleeve edge 15 radial outlet ports 23, 123 are bored through the valve body 1.

A duct 17, 18 through the piston bottom 110 and stem 16 puts into communication the chambers on both sides of said piston 10 and permits a throttled flow of the liquid.

The cylindrical chamber 19 enclosed by sleeve 14 constitutes a shock absorber or dampener cylinder, in which a motion-damping plunger 13, connected by a stem 16 with the main piston safety valve bottom 110, is slidably mounted so as to move at the unison with the relief valve piston 10. Plunger 13, by sliding, promotes a throttled flow of the liquid across the plunger. This is obtained preferably by cutting into the periphery of the plunger 13 one or more longitudinal grooves 30 extending along the whole plunger thickness. In the walls of the cylindrical chamber 14, in an intermediate position between the piston valve bottom 110 and the plunger 13, corresponding radial intake ports 20–120 and 22–121 are bored through adjoining cylindrical walls of body 1 and sleeve 14.

The above-described parts are enclosed in the said cylindrical body 1 which is open at its bottom end, in correspondence of the dampening plunger 13. The whole forms a safety valve unit which is inserted in a blind bore 31 of a supporting member or block K, forming a part of the hydraulic pressure line. The body 1 is mounted into said bore 31 by screwing its screw-threaded section 25 into a corresponding threaded section of bore 31. A, for example hexagonal, head 28 renders the screwing and unscrewing of the safety valve unit easy. When the unit is mounted in bore 31, the bottom of this blind bore closes the bottom end of said unit, thus completing the plunger cylinder.

In the cylindrical walls of bore 31 a wide annular channel S is cut, which extends beyond both valve body outlet ports 24–124 and 23–123. In this annular channel opens the radial bore S1 connected to a conventional liquid discharge duct (not shown). The fluidtight fitting of the unit in bore 31 of block K is guaranteed by annular gaskets 26, 27 and 32. Block K may constitute a part of the hydraulic line in which the safety valve is mounted.

Another annular channel or groove M is provided in the cylindrical walls of said bore 31 in correspondence with the ports 20–120 and 21–121 of the unit inserted therein. In this annular channel opens the end of a conventional fluid-infeed duct M1.

The operation of the above-described safety valve is apparent:

The liquid fed through M1 fills up the front piston valve chamber 22 and, through throttle ducts 18 and 17, also the rear chamber 2. At the same time, some liquid leaks through groove 30 into the bottom part of the cylinder 29 of the dampener. Until the pilot needle valve 6 remains closed, also the balanced piston relief valve 10, urged against its seat 15 by the liquid pressure on its top face and by spring 11, remains closed, i.e. with its bottom 110 seated against seat 15.

When the pressure of the liquid in chamber 2 exceeds the safety value, the pilot valve 6 is opened and through bore 4 dumps some liquid under pressure from chamber 2 into the needle valve chamber 3 from which it is discharged through outlet bores 24. Thus, due to venting of the liquid pressure above piston 10, this piston is pushed by hydraulic pressure upwardly, so as to uncover the large ports 23–123 and allow a substantial dumping of liquid under pressure from the system, through port S.

When, after this dumping, the pressure of the liquid falls below the safety value, the pilot valve 6 is allowed to close so that the liquid pressure and the pressure of spring 11 shift the relief valve 10 to closing position.

The opening and closure movements of the relief valve 10 are dampened by the attached damping plunger 13, so that, especially its closing, is effected very smoothly.

Many constructional variations may be brought to the above-described pilot-operated safety valve unit, though remaining within the scope of the appended claims.

I claim:

1. A safety valve unit for hydraulic pressure lines, comprising a body provided with an inlet and an outlet duct, a relief piston valve mounted in said body and defining two separate chambers, i.e., a front-pressure chamber defined by the front piston face and communicating directly with the inlet duct and a rear or back-pressure chamber communicating with the front chamber through a throttle flow duct, means for maintaining the said relief valve closed whenever the pressure of the liquid is steadily equal in both said separate chambers, an automatic pilot valve in the form of a needle valve disposed in a third chamber connected to the liquid outlet duct, said pilot valve being urged by a spring to closing position and adapted to be opened by the pressure of the liquid in said back-pressure chamber when said pressure exceeds a limit value considered safe, whereafter the said relief piston valve is first instantaneously fully opened by the momentarily prevailing pressure on its front face, due to the automatically reduced back pressure promoted by the opening of said pilot valve and thereafter, after the automatic closing of the said pilot valve, the said back pressure is rebuilt and the relief valve is again closed, and plunger means connected to said relief valve for damping its motion so as to prevent shocks and chatter, said relief and pilot valves, said damping plunger and said body constituting a single unit provided with said inlet and outlet ducts for connecting same to the pressure line of a hydraulic system, means being also provided for connecting said unit to a supporting and connecting block forming an integral part of the said hydraulic system, said block having a partly screw-threaded cylindrical blind bore in which ports are provided in correspondence of the said ducts in said valve unit when the same is fully screwed into operating position.

2. A safety valve unit for hydraulic pressure lines, according to claim 1, wherein the means for maintaining the relief valve closed whenever the pressure of the liquid is equal on both faces of the relief piston valve are spring means.

3. A safety valve unit for hydraulic machinery, according to claim 1, wherein said relief valve is of the differential-piston type, having a rear piston face larger than its front piston face.

4. A safety valve unit for hydraulic machinery, according to claim 1, wherein said relief valve is of the differential-piston type, with its rear face larger than its front face, spring means being provided for additionally urging the valve towards closing position.

5. A safety vale unit for hydraulic pressure lines, comprising a body, a bore in said body defining a cylindrical cavity closed near its upper end by a partition having a through bore with a valve seat, duct means opening in the sidewall of said bore for the inflow and outflow of fluid, a plug closing said bore above said partition, a spring-urged automatic pilot valve mounted in said plug and cooperating with said valve seat to close it, a tumbler-shaped piston valve having a closed bottom slidably mounted with a tight fit in the upper portion of said cylindrical cavity below the partition, a sleeve fitted into the lower portion of said cylindrical cavity so as to define a second cylindrical cavity of smaller sectional area, the upper edge of said sleeve forming a second valve seat against which the closed bottom of said tumbler-shaped piston valve may bear with a tight fit, a motion-damping plunger rigidly attached in spaced relation to said closed bottom of said tumbler-shaped piston valve and slidably mounted within the lower end section of said sleeve, passage means in the motion-damping plunger for permitting the throttled flow of fluid thereacross, a fluid inlet chamber communicating with said inflow duct means and positioned between the bottom of said tumbler-shaped piston valve and the facing side of said motion-damping plunger, a second chamber in said first cylindrical cavity below said partition and extending into said tumbler-shaped piston valve, a fluid duct through the closed bottom of said tumbler-shaped piston valve, permitting throttled fluid flow between the inlet chamber and said second chamber, and duct means through the wall of said bore above the partition for communicating the piston valve controlled through bore in the partition with said fluid outflow duct means, said tumbler-shaped piston valve cooperating with said second valve seat to close and open communication between said fluid inlet chamber and said fluid outflow duct means.